United States Patent
Ichikawa

(10) Patent No.: US 7,840,169 B2
(45) Date of Patent: Nov. 23, 2010

(54) TRANSFER ROLL AND IMAGE FORMING APPARATUS

(75) Inventor: Kazuyuki Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 590 days.

(21) Appl. No.: 11/806,211

(22) Filed: May 30, 2007

(65) Prior Publication Data

US 2008/0057289 A1 Mar. 6, 2008

(30) Foreign Application Priority Data

Sep. 5, 2006 (JP) ............................. 2006-240345
Apr. 27, 2007 (JP) ............................. 2007-119133

(51) Int. Cl.
*G03G 15/20* (2006.01)

(52) U.S. Cl. ...................... 399/313; 399/308

(58) Field of Classification Search .............. 399/308, 399/313
See application file for complete search history.

(56) References Cited

U.S. PATENT DOCUMENTS

| | | | |
|---|---|---|---|
| 5,168,313 A * | 12/1992 | Hosaka et al. | 399/313 |
| 5,264,902 A * | 11/1993 | Suwa et al. | 399/333 |
| 5,878,314 A * | 3/1999 | Takaya et al. | 399/302 |
| 6,665,512 B1 * | 12/2003 | Yanagida et al. | 399/313 |
| 2003/0103784 A1 * | 6/2003 | Swift | 399/313 |
| 2004/0096248 A1 * | 5/2004 | Tomizawa | 399/313 |
| 2004/0156656 A1 | 8/2004 | Okamoto | |
| 2004/0247340 A1 * | 12/2004 | Miura et al. | 399/176 |
| 2006/0104651 A1 * | 5/2006 | DiRubio et al. | 399/66 |

FOREIGN PATENT DOCUMENTS

| JP | 03041486 A * | 2/1991 |
|---|---|---|
| JP | A 06-095521 | 4/1994 |
| JP | A 06-124049 | 5/1994 |
| JP | A- 2000-274425 | 10/2000 |
| JP | A 2002-236415 | 8/2002 |
| JP | A-2006-10755 | 1/2006 |

* cited by examiner

*Primary Examiner*—David P Porta
*Assistant Examiner*—Benjamin Schmitt
(74) *Attorney, Agent, or Firm*—Oliff & Berridge, PLC

(57) ABSTRACT

A transfer roll including a metal shaft, one or more elastic layers provided around the periphery of the metal shaft, and a surface layer including a foam-containing layer provided around the periphery of the one or more elastic layers.

21 Claims, 3 Drawing Sheets

TRANSFER ROLL AND IMAGE FORMING APPARATUS

CROSS-REFERENCE TO RELATED APPLICATIONS

This application claims priority under 35 USC 119 from Japanese Patent Application No. 2006-240345 filed on Sep. 5, 2006 and No. 2007-119133 filed on Apr. 27, 2007.

BACKGROUND

1. Technical Field

The invention relates to a transfer roll used and an image forming apparatus using the same.

2. Related Art

In an image forming apparatus using an electrographic system, electric charges are formed on an image holding member comprising a photoconductive photoreceptor using inorganic or organic materials, and an electrostatic latent image is formed using a laser light or the like obtained by modulating an image signal, and subsequently the electrostatic latent image is developed with a toner into a visible toner image.

Thereafter, the obtained toner image is electrostatically transferred to a recording medium such as recording paper in a direct manner or through an intermediate transfer medium, thus obtaining a desired reproduced image.

Particularly well known among the apparatus that use a system comprising a primary transfer of a toner image formed on an image holding member to an intermediate transfer member, and a secondary transfer of the toner image from the intermediate transfer member to recording paper, is a bias roll image forming apparatus system in which the recording paper is pressed against the intermediate transfer member by a conductive or semiconductive bias roll (having a volume resistivity of $10^{10}$ Ωcm or less), and a toner image is electrostatically transferred to the paper by application of a voltage.

SUMMARY

According to an aspect of the invention, there is provided a transfer roll comprising a metal shaft, one or more elastic layers provided around the periphery of the metal shaft, and a surface layer comprising a foam-containing layer provided around the periphery of the elastic layer.

BRIEF DESCRIPTION OF THE DRAWINGS

Exemplary embodiments of the present invention will be described in detail based on the following figures, wherein.

DETAILED DESCRIPTION

Figure 1:
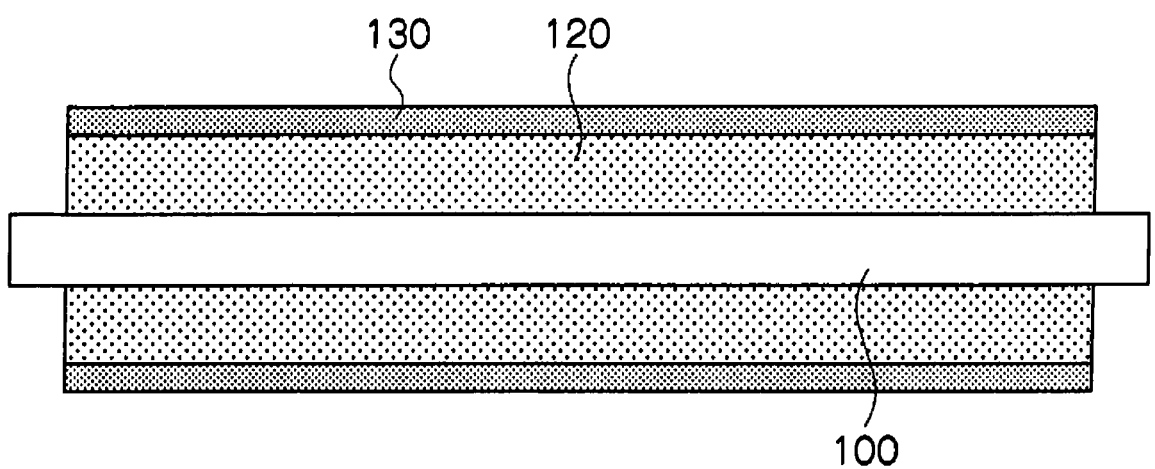
FIG. 1 is a sectional view showing an example of the roll of the invention.

The invention is further described in detail below.

<Transfer Roll>

The transfer roll of the invention comprises a metal shaft, one or more elastic layers provided around the periphery of the metal shaft, and a surface layer comprising a foam-containing layer provided around the periphery of the elastic layer.

More specifically, with regard to the invention, it has been found that a layer containing a specific form of bubbles (foam-containing layer) provided in the surface layer of the transfer roll reduces a shock given by recording paper colliding with the transfer roll, even when, for example, a thick paper (recording medium) having a basis weight of 100 g/m² or more enters into the transfer part in the image forming apparatus. It has been also found that the shock reduction eliminates the variation of the form of the transfer roll itself and the speed fluctuation of the intermediate transfer medium in a secondary transfer system, and prevents the occurrence of banded density irregularities in the transfer process.

The above-described foam refers to plural bubbles which are formed within the surface layer by being surrounded by a material composing the surface layer, and separated by films of the material.

Further, the foam-containing layer in the invention may be the whole of the surface layer, or a part of the surface layer. In the latter case, the foam-containing layer may be disposed in proximity to the outermost surface of the surface layer, or in the inside far from the outermost surface. No opening of bubbles exists on the outermost surface of the surface layer.

In the transfer roll of the invention, the mechanism of the reduction of a shock given by recording paper colliding with the roll is not yet clarified, but is presumed as follows.

When bubbles exist in the surface layer, a force applied to the outermost surface of the transfer roll by recording paper colliding with the transfer roll concentrates around the bubbles as a stress. At this time, if bubbles are continuous, the stress concentrates in a large area, in turn the shock is transferred to a considerable part of the surface layer. On the other hand, when the foam is composed of independent bubbles, the force applied to the outermost surface induces stress concentration only on bubbles existing at the position, thus the shock remains at the position unless the bubbles are broken, thereby the rotation of the transfer roll is not inhibited. Therefore when the transfer roll of the invention is used, for example, in a transfer process, banded density irregularities (banding) in the process direction are presumed to be prevented. Accordingly, the transfer roll of the invention is preferably used in cases in which the roll is used in a position receiving shocks.

The components of the transfer roll of the invention are further described below by referring to the exemplary embodiments.

The transfer roll of the exemplary embodiments of the invention is not particularly limited as to its composition as long as it includes one or more elastic layers and surface layer formed in lamination in this order around the periphery of a metal shaft as a core bar, and may include other layers.

(Metal Shaft)

The metal shaft is a cylindrical member which serves as an electrode and a supporting member of the transfer roll, and includes a conductive material having a volume resistivity of $10^4$ Ωcm or less, including a metal or alloy such as aluminum, copper alloy, or stainless steel; iron plated with chromium, nickel or the like; or conductive resin. Any of these materials is useful as a metal shaft in light of their strength and electrical characteristic. The outside diameter of the metal shaft is preferably in the range of 3 to 20 mm in usual cases.

(Elastic Layer)

The elastic layer may be composed of a nonfoamed layer alone, or a foamed layer and a nonfoamed layer provided on the surface (outside) of the foamed layer. The foamed layer and nonfoamed layer may include plural layers. The elastic layer refers to a layer containing a material which returns to its original shape even after deformations by the application of an external force of 100 Pa.

The elastic layer is, for example in a transfer roll, a member which forms a contact zone under an appropriate pressure, and thereby enables to form a transfer electric field. Therefore, the resistance of the elastic layer is preferably adjusted, and the adjustment may be achieved, for example, by dispersing a conductive agent in the rubber material composing the elastic layer.

Examples of the rubber material composing the elastic layer include epichlorohydrin, polyurethane, nitrile rubber, isoprene rubber, butadiene rubber, epichlorohydrin-ethylene oxide rubber, ethylene-propylene-diene rubber (EPDM), styrene-butadiene rubber (SBR), chlorinated polyisoprene, acrylonitrile-butadiene rubber (NBR), chloroprene rubber (CR), hydrogenated polybutadiene, butyl rubber, and silicone rubber, and blends of two or more of them. Preferable examples are urethane rubber, nitrile rubber, epichlorohydrin-ethylene oxide rubber, and ethylene-propylene-diene rubber (EPDM). Since these rubber materials have elasticity, any of them is preferably used as a material composing the elastic layer. Particularly preferable is a synthetic rubber mainly composed of epichlorohydrin because the rubber itself has a measure of electrical conductivity (ion electrical conductivity).

When the elastic layer is composed of a nonfoamed layer and a foamed layer, the rubber material is preferably composed mainly of an epichlorohydrin rubber, which may be blended with other one or more organic rubbers such as NBR, EPDM, SBR, or CR. Examples of the epichlorohydrin rubber mainly used in the nonfoamed layer and foamed layer include Gechron 1100, Gechron 3100, Gechron 3101, Gechron 3102, Gechron 3103, Gechron 3105, and Gechron 3106 manufactured by Zeon Corporation, which have different volume resistance values, and two or more of the products of different grades may be combined for achieving an intended resistance value.

As the above-described electro-conductive agent contained in the elastic layer, an electronic conductive agent or ionic conductive agent is used. Examples of the electronic conductive agent include fine powders of carbon black such as Ketjen Black and acetylene black; pyrolytic carbon, graphite; various metals or alloys thereof such as aluminum, copper, nickel, and stainless steel; various metal oxides such as tin oxide, indium oxide, titanium oxide, tin oxide-antimony oxide solid solution, and tin oxide-indium oxide solid solution; and insulating substances with a conductive surface. Examples of the ionic conductive agent include perchlorates and chlorates such as tetraethyl ammonium and lauryltrimethyl ammonium; and alkali metals such as lithium and magnesium, perchlorates and chlorates of alkaline earth metals. Any of these conductive agents is preferably used because they are capable of imparting conductivity to the elastic layer.

These conductive agents may be used alone or in combination of two or more of them. The addition amount of the agent is not particularly limited, but for the above-described electronic conductive agent, preferably in the range of 1 to 30 parts by weight, and more preferably in the range of 10 to 20 parts by weight relative to 100 parts by weight of the rubber material. On the other hand, for the above-described ionic conductive agent, the addition amount is preferably in the range of 0.1 to 5.0 parts by weight, and more preferably in the range of 0.5 to 3.0 parts by weight relative to 100 parts by weight of the rubber material.

In the exemplary embodiments of the invention, the volume resistivity of elastic layer is preferably in the range of $10^6$ to $10^9$ Ωcm, and more preferably in the range of $10^6$ to $10^8$ Ωcm.

The volume resistivity is measured for a measurement sample in a sheet form using a measuring tool (R12702A/B Resistivity Chamber, manufactured by Advantest Corporation) and a high resistance meter (R8340A digital high resistance/minute ammeter, manufactured by Advantest Corporation), and calculated by the following formula (1) using an electric current value measured after the application of a voltage adjusted to obtain electric field (applied voltage/composition sheet thickness) of 1,000 V/cm for 30 seconds.

$$\text{Volume resistivity (Ω·cm)} = (19.63 \times \text{applied voltage (V)})/(\text{electric current value (A)} \times \text{sheet thickness of measurement sample (cm)}) \quad \text{Formula (1)}$$

Further, the elastic layer has a hardness preferably in the range of 15 to 90° in Ascar C hardness. When the Ascar C hardness is higher than 90°, for example, stability of the contact condition with the intermediate transfer medium is undermined, which may result in image quality defects. When the hardness is lower than 15°, elasticity recovery force decreases, which may result in the failure of correspondence to speedup.

Ascar C hardness is measured by pressing a measuring stylus Ascar C type hardness meter (manufactured by Koubunshi Keiki Co., Ltd.) against the surface of a measuring sheet of 3 mm thickness under a load of 1,000 g.

The thickness of the elastic layer is preferably in the range of 2 to 7 mm, and more preferably in the range of 3 to 5 mm. If the thickness is less than 2 mm, the contact part between the elastic layer and other members is insufficiently deformed by the contact pressure, which may cause problems such as failure of stable formation in the contact part. On the other hand, if the thickness is more than 7 mm, the outside diameter of the transfer roll becomes significantly large, which may cause problems such as the increase in the apparatus dimension and the cost.

After the formation of the elastic layer, the transfer roll surface (elastic layer surface) may be polished to make the outside surface into a desired shape (desired outside diameter). After polishing the surface, a surface layer or the like may be formed. The method for polishing is not particularly limited, and may be a known method such as a cylindrical polishing method or centerless polishing method.

(Surface Layer)

In the exemplary embodiments of the invention, the material composing the surface layer is not particularly limited, but preferably a polymer material from the viewpoint of preventing bleeding or bloom.

Examples of the polymer material composing the surface layer include polyamide, polyurethane, polyvinylidene fluoride, ethylene tetrafluoride copolymer, polyester, polyimide, silicone resin, acrylic resin, polyvinyl butyral, ethylene-tetrafluoroethylene copolymer, melamine resin, fluorine rubber, epoxy resin, polycarbonate, polyvinyl alcohol, cellulose, polyvinylidene chloride, polyvinyl chloride, polyethylene, and ethylene-vinyl acetate copolymer. The polymer material composing the surface layer may be used alone, or in combination of two or more of them.

When urethane is used as the main component of the surface layer, it may be combined with a fluorine-based material or silicon-based material.

Further, the surface layer may be formed as a composition prepared by mixing the above-described polymer material with a conductive agent or various particles used for the elastic layer. As the particles, particles of a metal oxide or composite metal oxide such as silicon oxide, aluminum oxide, or barium titanate, or fine powder of a polymer such as tetrafluoroethylene or vinylidene fluoride is used alone or in combination of them, but the examples are not particularly limited to them.

The volume resistance value of the surface layer is preferably in the range of $1\times10^5$ to $1\times10^{10}$ Ωcm, and more preferably in the range of $1\times10^7$ to $1\times10^9$ Ωcm. If the volume resistance value is less than $1\times10^5$ Ωcm, transfer failures may occur, and if higher than $1\times10^{10}$ Ωcm, image quality defects such as discharge or transfer voids may occur, both of which are undesirable.

The thickness of the surface layer is preferably in the range of 0.1 to 30 μm, and more preferably in the range of 0.5 to 20 μm. When the surface microhardness of the elastic layer is less than 40°, the film thickness of the surface layer is preferably in the range of 15 to 25 μm, and when the surface microhardness of the elastic layer is 40° or more, the film thickness of the surface layer may be 5 μm or more.

As described above, the surface layer in the exemplary embodiments of the invention includes a foam-containing layer. The maximum diameter of bubbles composing the foam is preferably in the range of 0.1 to 30 μm, and more preferably in the range of 0.5 to 20 μm. The maximum diameter of bubbles influences the surface roughness of the surface layer. Hence if the maximum diameter is less than 0.1 μm, the surface roughness is insufficient, which may deteriorate the cleanability of the transfer roll surface to be described below to cause the adhesion of toner external additives. When the maximum diameter is more than 30 μm, the surface is too rough, which not only deteriorates the transfer property, but also causes the exposure of bubbles at the outermost surface of the surface layer.

Further, the variation of the maximum diameter of bubbles is preferably in the range of 0 to 1%, and more preferably in the range of 0 to 0.5%. When the variation of the maximum diameter is more than 1%, cleanability may deteriorate even if the maximum diameter is in the above-described range. The variation is preferably smaller, and no variation (0%) is most ideal. When the foam-containing layer includes plural layers each containing bubbles of different maximum diameters, the variation of the maximum diameter of bubbles means the variation in each layer.

When a cleaning blade is used for cleaning of the surface of the transfer roll, the maximum diameter of the bubbles composing the foam at the end parts of the transfer roll in the axial direction is preferably greater than the same at the central part of the transfer roll in the axial direction, from the viewpoint of preventing a cleaning blade from riding up due to the friction of the surface of the transfer roll and the cleaning blade.

That is, by making the size (maximum diameter) of bubbles composing the foam existing in the surface layer of the transfer roll at the ends of the transfer roll in the axial direction, at which the end parts of the blade come to be contact with the transfer roll, greater than the same at the central part of the transfer roll, the part corresponding to an image transfer part, the friction of the blade and the surface of the transfer roll at the ends of the transfer roll can be reduced, which contributes to prevention of riding up of the ends of a blade.

Specifically, it is preferable to regulate the maximum diameter of bubbles at the central part of the transfer roll to be in the range of 0.1 to 5 μm and the maximum diameter of bubbles at the end parts of the transfer roll to be in the range of more than 5 μm and 30 μm or less. Considering paper releasability and friction resistance of a cleaning blade to be pressurized, it is more preferable to regulate the maximum diameter of bubbles at the central part of the transfer roll to be in the range of 2 to 5 μm and the maximum diameter of bubbles at the end parts of the transfer roll to be in the range of more than 5 μm and 20 μm or less.

Further, the difference between the above two maximum diameters is preferably in the range of 5 to 25 μm, and more preferably in the range of 10 to 20 μm.

Here, the central part of the transfer roll in the axial direction indicates the area within the range of ±15% of the whole length of the transfer roll (elastic layer part) from the center thereof, and the end parts indicates the areas within the range of 30% of the whole length of the transfer roll from the end faces of the transfer roll, hereinafter the same shall apply.

The maximum diameter of bubbles may be determined by observing a cross-section of the surface layer with a scanning electron microscope (SEM) at a magnification of 10,000 times, and measuring the maximum diameter of bubbles in each view. Further, the variation of the maximum diameter is determined as follows: the maximum diameters of 30 bubbles in total are measured at several points in the field of view; the average value thereof is determined; and the ratio of the difference between the average value and the maximum value (or the minimum value) of the measurements to the average value is expressed as the variation of the maximum diameter.

The amount of bubbles in the foam-containing layer is preferably in the range of 30 to 90%, and more preferably in the range of 50 to 80%, in an area ratio. When the area ratio is less than 30%, the microhardness of the surface layer to be described below may be too high. If the abundance is more than 90%, the surface layer may be deformable more than necessary.

The area ratio may be determined by the above-described image processing in the field of view during an observation of a cross-section with SEM.

The thickness of the foam-containing layer is preferably in the range of 1 to 30 μm as described above. For example, in cases in which a fluorocarbon resin-based paint JLY-601E manufactured by Acheson (Japan) Ltd. is used as a coating agent, the foam-containing layer is preferably composed of three layers when the maximum diameter of retained bubbles is 0.1 to 10 μm; the foam-containing layer is preferably composed of two layers when the maximum diameter of retained bubbles is 10 to 15 μm; and the foam-containing layer is preferably composed of one layer when the size of retained bubbles is 25 to 30 μm. Bubbles in each layer are arranged on the same plane, respectively, thus they can be readily distinguished by the above-described image processing in the field of view during an observation of a cross-section with SEM.

In this case, when the foam-containing layer is composed of plural layers, the maximum diameter of retained bubbles may be the same or different from each other among the layers. When the maximum diameter of bubbles is different from each other among the layers, the size of bubbles may increase from the inside toward the outside of the transfer roll, or decrease from the inside toward the outside of the transfer roll. Alternatively, for example, when the layer is composed of three layers, the size of bubbles in the medium layer may be larger or smaller than the maximum diameter of bubbles in the inner layer and the outer layer.

Further, in the exemplary embodiments of the invention, the surface layer may comprise a solid coat layer containing no bubble at least either inside or outside of the foam-containing layer. In this case, the thickness of the layer provided is preferably in the range of 0.1 to 10 μm, and the thickness of the solid coat layer is preferably in the range of 20 to 50% of the total thickness of the surface layer.

In the exemplary embodiments of the invention, it is preferable that the thickness of the surface layer at the end parts of the transfer roll in the axial direction is greater than the same at the central part of the transfer roll in the axial direction, from the viewpoint of preventing transfer crease that occurs when the outside diameter of the transfer roll at the central part of the transfer roll in the axial direction is greater than the same at the end parts of the transfer roll in the axial direction.

On the other hand, similar effects to the above can also be obtained by making the outside diameter at the central part of the transfer roll by polishing or the like. In this case, however, a transfer roll having a left-right symmetry shape is difficult to obtain due to difference in the hardness of the surface of the transfer roll, and defects in longitudinal magnification (magnification in the direction in which a recording medium is delivered) or defects in color registration may be caused, which is not desirable.

In the exemplary embodiments of the invention, the surface layer may be formed, for example, as a coat layer, and thus the thicknesses of the surface layer at the central part and the end parts of the transfer roll in the axial direction can be changed at the time of coating. Here, from the viewpoint of preventing transfer crease which causes paper crease, without generating the above discussed defects in longitudinal magnification or defects in color registration, it is preferable to make the shape of the transfer roll left-right symmetry in which the outside diameter at the end parts is greater than that at the central part, by making the thickness of the surface layer at the end parts greater than that at the central part.

That is, in the surface layer including a foam-containing layer according to the exemplary embodiments of the invention, independent bubbles form the foam as described above and therefore strength applied onto the surface of the transfer roll concentrates on the bubbles. Then, when the outside diameters at the central part and the end parts of the transfer roll are changed by changing the thickness of this foam-containing surface layer, thickness of the aggregation of above independent minute bubbles virtually changes in the axial direction of the transfer roll.

Therefore, when the outside diameter at the central part of the transfer roll is made smaller by increasing the outside thickness of the transfer roll at the end parts, difference in hardness in the surface of the transfer roll is reduced, which contributes to prevention of defects in longitudinal magnification or defects in color registration, as compared with the case of reducing the outside diameter by polishing.

Specifically, it is preferable that the thickness of the surface layer at the central part of the transfer roll is in the range of 0.1 to 50 μm and the thickness of the surface layer at the end parts of the transfer roll is in the range of 0.6 to 300 μm. Further, in this case, it is preferable that the difference between the thicknesses at the central part and at the end parts of the transfer roll is in the range of 0.5 to 250 μm, more preferably in the range of 10 to 100 μm. Consequently, it is preferable that the difference between the outside diameters at the central part and at the end parts of the transfer roll is in the range of 1.0 to 500 μm, more preferably in the range of 20 to 200 μm. The outside diameter of the transfer roll can be determined by, for example, a laser sizer (LS-5120, manufactured by KEYENCE CORPORATION).

For the formation of the surface layer, for example, a fluorocarbon resin-based paint (JLY-601 E, manufactured by Acheson (Japan) Ltd.) can be used as a coating agent. It is preferable that the surface layer at the end parts of the transfer roll is composed of plural layers, in order to increase the thickness thereof relative to that at the central part.

The surface microhardness of the surface layer formed as described above is preferably 0.2 or less for absorbing the shock given by entering recording paper to a degree which will not affect other members.

The surface microhardness is determined by pressing a measuring stylus of a microhardness meter (MD-1, manufactured by Koubunshi Keiki Co., Ltd.) under a load of 4.9 N, and observing the value after a lapse of five seconds. The measurements are carried out at 12 points in total, which are composed of three points in the axial direction of transfer roll and four points in the circumferential direction, thereby calculating the average value therefrom as the microhardness.

Further, the surface roughness of the surface layer is preferably 15 μm or less in ten point average roughness Rz in consideration of the release properties of the developer such as a toner, and more preferably in the range of 5 to 15 μm in Rz in consideration of preventing curling of the cleaning blade when the blade is mounted on the transfer roll to be described below.

The surface roughness of the surface layer is measured for a transfer roll having a surface layer thereon according to a contact type surface roughness measuring method. The measuring apparatus is SURFCOM 570A manufactured by Tokyo Seimitsu Co., Ltd. The measurement is carried out, according to JIS B0601 (2001), at a reference length of 2.5 mm, an evaluation length of 12.5 mm, using a diamond stylus (2 μm, 90° cone), in an environment with a temperature of 22° C. and a humidity of 55% RH.

(Other Layers)

In the exemplary embodiments of the invention, in addition to the above-described elastic layer and surface layer, various layers may be provided between these layers or under the elastic layer. Rubber materials used for these layers may be the rubber materials or the like described in relation to the elastic layer, and may be combined with additives such as a conductive agent.

The method for producing the roll of the invention is further described below by reference to the exemplary embodiments. The transfer roll of the invention can be produced, for example, by preparing at least a molding composed of a metal shaft and an elastic layer formed around the periphery of the metal shaft, followed by forming a surface layer on the circumference surface of the elastic layer.

-Preparation of Elastic Layer-

In the first place, an elastic layer is provided on the surface of a metal shaft as a core bar. Examples of the method for preparing an elastic layer include extrusion molding of a mixture of a rubber material, a vulcanizing agent, and a vulcanization accelerator, followed by heating for vulcanization. A base material with the surface coated with an elastic layer coating solution is inserted into a heated cylindrical die, and centrifugally molded to form an elastic layer. As needed, additives such as a conductive agent may be added to the above-described mixture.

Further, prior to the coating to be described below, a primer layer may be formed on the surface of the base material for improving adhesiveness.

-Preparation of Surface Layer-

The surface layer is preferably formed by the application of a coating solution onto the surface of the elastic layer or the like, from the viewpoints that the lower layer is made of a heat-labile material in most cases, and that the method is capable of producing a surface layer being less variable in the characteristics thereof.

In the exemplary embodiments of the invention, the surface layer includes a foam-containing layer, and the foam-containing layer may be formed by applying a solution in which independent bubbles are formed during application, or by forming a layer by application, followed by the formation of independent bubbles in the layer in a drying process or the like. Alternatively, independent bubbles may be formed in advance in the coating solution, and the solution may be applied as is, or after further changing the amount or diameter of the independent bubbles. In the invention, it is preferable to use the method of generating independent bubbles in the solution during application from the viewpoint of readily controlling the diameter and amount of bubbles and others.

Formation of independent bubbles in the solution during application can be achieved by a method of applying a coating solution containing a material which generates bubbles (e.g., foaming agent or water) upon heating, or applying the same and thereafter heating, or other methods. In this case, the diameter of bubbles may be changed preferably by changing the heating temperature or heating period. The amount of bubbles may be changed preferably by adjusting the content of the above-described foaming agent.

The solvent for the coating solution may be water or an ordinary organic solvent such as methanol, ethanol, isopropanol, methyl ethyl ketone, or toluene. The coating solution may be combined with a conductive agent such as carbon black or a metal oxide, a dispersant such as a surfactant or coupling agent, or the like.

The surface tension of the coating solution is preferably higher for stabilizing the diameter of bubbles and decreasing the variation of the diameter. Further, the viscosity characteristic of the coating solution is preferably higher for preventing bubbles from being exposed at the surface of the layer after application.

The coating method may be an ordinary coating method such as a spray coating method, dipping coating method, or a spin coating method. In the exemplary embodiments of the invention, it is preferable to use the spray coating method from the viewpoint of workability, since there is a need to control thickness and surface roughness of the surface layer.

In the exemplary embodiments of the invention, the coating solution for forming the foam-containing layer preferably the one in which independent bubbles are readily generated in the solution, and the status of the generated bubbles can be maintained to some degree. Specifically, the coating method as described below is preferable.

For example, using an ink jet coating device having a thermal head, a coating liquid containing a foaming agent is applied while being heated with a thermal head, then bubbles are generated in the droplets of the coating liquid as the coating liquid passes through the thermal head, thereby forming the bubbles covered with the coating liquid. Since the coating liquid which is covering the bubbles is instantaneously heated by the thermal head, it can maintain the status thereof after the application. According to this coating method, bubbles covered with the coating liquid can be spread all over the surface of the elastic layer or the like, leaving no space between. Further, by repeating the above operation, another foam layer can be further formed on the first foam layer in lamination.

After coating, drying and curing are performed under heat. Prior to the above-described coating, a primer layer may be formed for improving adhesiveness.

FIG. 1 is a sectional view in the axial direction of a transfer roll of an exemplary embodiment of the invention. As shown in FIG. 1, the transfer roll of the invention comprises a columnar metal shaft 100, and around the periphery of the metal shaft 100 are provided a cylindrical elastic layer 120 and a surface layer 130 containing a foam-containing layer, in this order. As needed, an adhesive layer may further be provided at the interface where the metal shaft 100 and the elastic layer 120 closely adhere to each other.

The transfer roll of the exemplary embodiments of the invention is preferably used as a transfer roll, for example, in a transfer device (transfer unit) composing an image forming apparatus. When the transfer roll is pressed against an image holding member composing the image forming apparatus, a predetermined nip (a contact area having a width in the traveling direction) is formed. Further, the transfer efficiency of the toner is dependent on the area of the contact area. Accordingly, if the width of the contact area between the transfer roll and the image holding member varies, transfer irregularity may occur.

The hardness of the transfer roll of the exemplary embodiments of the invention is preferably in the range of 15° to 90°, and more preferably in the range of 20° to 50°, in Ascar C hardness. If the hardness is less than 15°, deformation of the transfer roll under external pressure may be increased, and for example, in the case of a transfer roll provided with a cleaning blade, deformation due to the cleaning blade may affect the shape of the contact zone of the transfer part, which may result in a failure of achieving a stable contact area. Further, other problems such as stripping of the recording paper along the opposite roll to the transfer roll may occur.

When the hardness exceeds 70°, the pressing pressure to obtain a contact width of 2 mm to 4 mm at the transfer part is increased, which allows the load of the pressing pressure by the transfer roll to concentrate at the transfer part, and thus image quality defects such as hollow defects in a line image may occur. When the pressing pressure to obtain a contact width of 2 mm to 4 mm at the transfer part is in the range of 0.3 kg/cm$^2$ to 0.6 kg/cm$^2$ (29.4 to 58.8 kPa), favorable transfer image quality can be achieved.

The measurement of Ascar C hardness can be conducted by pressing a measuring stylus of an Ascar C type hardness meter (manufactured by Koubunshi Keiki Co., Ltd.) against the surface of the transfer roll under a load of 1,000 g. The measurement of Ascar C hardness described below is conducted in accordance with this method.

The resistance value of the transfer roll of the exemplary embodiments of the invention is preferably in the range of $1 \times 10^5$ to $1 \times 10^{11} \Omega$, and more preferably in the range of $1 \times 10^6$ to $1 \times 10^9 \Omega$. If the resistance value of the transfer roll is lower than $1 \times 10^5 \Omega$, in the case of performing transferring of only a single color, the transfer electric field may be lowered and transfer defects may occur. If the resistance value is higher than $1 \times 10^{11} \Omega$, applying of high voltage to achieve a transfer electric field is required, which not only necessitates a high voltage power supply but also may cause image defects such as white voids, because stripping discharge tends to occur more easily at the contact zone and the following zone thereof in an environment of low temperature and low humidity (10° C., 15% RH).

The resistance value R ($\Omega$) of the transfer roll is measured by: placing the transfer roll on a conductive body such as a metal plate; applying a load of 4.9 N respectively to both ends of the transfer roll; applying a voltage V of 1.0 kV to the shaft of the transfer roll; reading a current value I (A) that flows between the shaft of the transfer roll and the metal plate after a lapse of 10 seconds from the application of the voltage V; then calculating the resistance value R from the following formula (2). The measuring environment is set at 22° C. and 55% RH. The measurements of the resistance value of the transfer roll described hereinafter are conducted in accordance with this method.

$$R=V/I \quad \text{Formula (2)}$$

In cases where the transfer roll of the exemplary embodiments of the invention is used as a transfer member (transfer roll) in the image forming apparatus, it may be used in an embodiment in which a cleaning blade is placed so as to be in contact with the surface of the transfer roll. In particular, as described above, when the transfer roll has a surface layer including a foam-containing layer in which the maximum diameter of bubbles and the variation in the maximum diameter of bubbles are controlled to be within the preferable ranges, cleanability of a cleaning blade can be enhanced since the surface of the transfer roll is roughened to a proper degree. Further, by applying a cleaning blade as a cleaning device, the toner adhered to the surface of the transfer roll can be effectively removed.

As the material for the cleaning blade, metals or rubbers are preferably used. Examples of the above metals include SUS, aluminum, iron, copper and phosphor bronze, wherein SUS is preferable. Examples of the above rubbers include urethane rubbers, silicone rubbers, fluorocarbon rubbers, chloroprene rubbers and butadiene rubbers, wherein urethane rubbers are preferable, from the viewpoint of abrasion resistance.

<Image Forming Apparatus>

The image forming apparatus of the exemplary embodiments of the invention includes at least an image holding member, a charging unit for charging the surface of the image holding member, a developing unit for developing the latent image formed on the surface of the image holding member into a toner image, and a transfer unit for transferring the toner image to a recording medium, and the above-described transfer roll composing the transfer unit is the transfer roll of the exemplary embodiment of the invention.

The above-described transfer roll may be a primary transfer roll which directly transfers a toner image from the above-described image holding member to a recording medium, but is preferably a secondary transfer roll which is provided with an intermediate transfer member and temporarily transfers a toner image formed on the above-described image holding member onto the intermediate transfer member, then further transfers the toner image on the intermediate transfer member onto a recording medium.

In the image forming apparatus of the exemplary embodiments of the invention, a cleaning blade is preferably placed so as to be in contact with the surface of the transfer roll of the exemplary embodiments of the invention.

The depth of the cleaning blade pressing into the surface of the transfer roll is preferably in the range of 0.1 to 2.0 mm, and particularly more preferably in the range of 0.2 to 1.0 mm. When the depth of pressing is 0.1 mm or more, for example, the toner adhered to the surface of the transfer roll to be described below can be effectively removed. When the depth of pressing exceeds 2.0 mm, the cleaning blade may damage the surface layer of the transfer roll to cause problems such as faulty cleaning, in the cases of continued use.

The contact angle between the cleaning blade and the surface of the transfer roll is preferably in the range of 15 to 45°, and particularly preferably in the range of 20 to 40°. When the contact angle is in the range of 15 to 45°, for example, the toner adhered to the surface of the transfer roll can be effectively removed.

The toner used in the image forming apparatus of the exemplary embodiments of the invention is preferably a toner having a shape factor SF1 of 130 or less, wherein SF1 is represented by the following formula (3).

$$SF1=(ML^2/A)\times(\pi/4)\times100 \quad \text{Formula (3)}$$

In the formula (3), ML represents the absolute maximum length of the toner particles, and A represents the projected area of the toner particles.

The shape factor SF1 of the toner can be obtained by: importing an optical microscope image of toner particles or a toner scattered on a glass slide into a Luzex image analyzer (manufactured by Nireco Corp.) via a video camera; measuring the maximum lengths and the projected areas of the toner particles of 50 or more; calculating the values of SF1 by the formula (3); and determining the average value thereof.

Hereinafter, an exemplary embodiment of the image forming apparatus (the image forming apparatus of the invention) in which the transfer roll of the invention can be preferably used will be illustrated, but the invention is not limited thereto. The essential parts indicated in the drawings will be described below, but the description of the other parts will be omitted.

Figure 2:
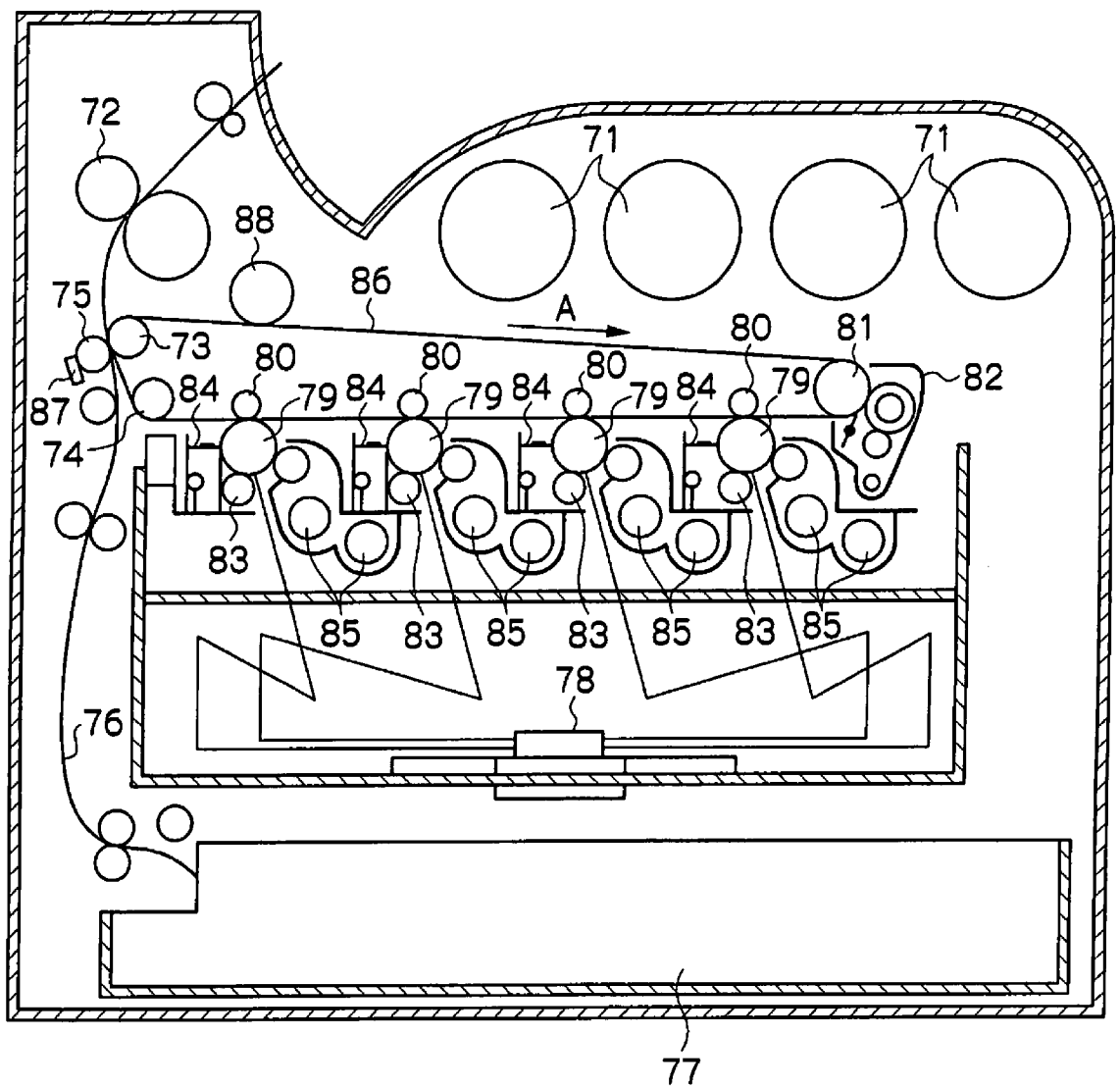
FIG. 2 is a schematic block diagram showing an example of the image forming apparatus of the invention.

FIG. 2 is a schematic block diagram showing an exemplary embodiment of the image forming apparatus of the invention. The image forming apparatus shown in FIG. 2 is a full color image forming apparatus of train-of-four tandem system, and comprises four toner cartridges 71, a pair of fixing rolls 72, a backup roll 73, a tension roll 74, a secondary transfer roll 75, a paper channel 76, a paper feeding unit 77, a laser generating device 78, four photoreceptors (image holding members) 79, four primary transfer rolls 80, a driving roll 81, a transfer cleaner 82, four charging rolls 83, photoreceptor cleaners 84, developing devices 85, an intermediate transfer belt (intermediate transfer member) 86, a discharging roll 88, and others as major component members. In the image forming apparatus shown in FIG. 2, the transfer roll of the invention is used as the secondary transfer roll 75.

In the next place, the structure of the image forming apparatus shown in FIG. 2 will be described in due order. Around a photoreceptor 79, a charging roll 83, a developing device 85, a primary transfer roll 80 disposed via the intermediate transfer belt 86, and a photoreceptor cleaner 84 are disposed counterclockwise, and the group of the members forms a developing unit corresponding to a color. Further, a toner cartridge 71 for supplying a developer to a developing device 85 is provided in each developing unit, and a laser generating device 78 is provided for a photoreceptor 79 in each developing unit, the laser generating device 78 being capable of radiating a laser light according to image information to the surface of the photoreceptor 79 disposed between a charging roll 83 and a developing device 85.

The four developing units corresponding to four colors (for example, cyan, magenta, yellow, and black) are serially disposed in the horizontal direction in the image forming apparatus, and intermediate transfer belt 86 is provided in such a manner that the intermediate transfer belt 86 is inserted through the contact zones between the photoreceptors 79 and the primary transfer rolls 80 of the four developing units. The intermediate transfer belt 86 is suspended in a tensioned state by a backup roll 73, a tension roll 74, and a driving roll 81 which are provided at the inner circumference of the belt. The four primary transfer rolls are located on the way of the intermediate transfer belt 86 which travels from the backup roll 73 to the tension roll 74. Further, a transfer cleaner 82 for cleaning the circumference surface of the intermediate transfer belt 86 is provided in opposition to the driving roll 81 via the intermediate transfer belt 86 in such a manner that the transfer cleaner 82 and the driving roll 81 are pressed against each other.

Further, a secondary transfer roll 75 for transferring the toner image formed on the circumference surface of the intermediate transfer belt 86 to the surface of recording paper conveyed from a paper feeding unit 77 through a paper channel 76 is provided in opposition to the backup roll 73 via the intermediate transfer belt 86 in such a manner that the secondary transfer roll 75 and the backup roll 73 are pressed against each other. A discharge roll 88 for discharging the circumference surface of the intermediate transfer belt 86 is provided on the circumference surface of the intermediate transfer belt 86 between the backup roll 73 and the driving roll 81.

Further, the paper feeding unit 77 for storing recording paper is provided at the bottom of the image forming apparatus, the paper feeding unit 77 being capable of feeding recording paper through the paper channel 76 in such a manner that the paper passes through the compression part between the backup roll 73 and the secondary transfer roll 75 composing the secondary transfer part. The recording paper which has passed through the compression part may be further conveyed by a conveying unit (not shown) in such a manner that the paper is inserted through the compression part between a pair of fixing rolls 72 to be finally ejected out of the image forming apparatus.

The method for forming an image with the image forming apparatus shown in FIG. 2 is illustrated below. A toner image is formed in each developing unit. The surface of the photoreceptor 79 rotating in a counterclockwise direction is charged by the charging roll 83, subsequently a latent image is formed on the charged surface of the photoreceptor 79 by the laser generating device 78 (exposure device). Thereafter the latent image is developed with a developer supplied from the developing device 85 to form a toner image, and the toner image transferred to the compression part between the primary transfer roll 80 and the photoreceptor 79 is transferred to the circumference surface of the intermediate transfer belt 86 rotating in the direction indicated by arrow A. In preparation for the formation of the next toner image, the photoreceptor 79 after transferring the toner image is cleaned by the photoreceptor cleaner 84 to remove toner and dust adhered to the surface thereof.

The toner images developed in each developing unit corresponding to each color are conveyed to the secondary transfer part in a state that they are sequentially superimposed on the circumference surface of the intermediate transfer medium 86 in accordance with image information, and transferred by the secondary transfer roll 75 to the surface of recording paper which has been conveyed from the paper tray 77 through the paper channel 76. The recording paper to which the toner images have been transferred is fixed by being heated under pressure when the paper passes through the compression part between the pair of fixing rolls 72 composing the fixing part, and an image is formed on the surface of the recording medium, followed by ejection out of the image forming apparatus.

In the exemplary embodiments of the invention, when the above-described angle of entry of the recording medium into the secondary transfer part is α, α is preferably in the range of ±10 to 40°, and more preferably in the range of ±15 to 30°. If α is less than ±10°, flexibility in designing the transfer system for transferring recording paper to the transfer part is decreased, which may result in the enlargement of the whole apparatus. On the other hand, if α is greater than ±40°, even if the roll of the invention is used, the shock of the collision of recording paper may fail to be absorbed to such a level that the occurrence of image defects can be prevented.

Figure 3:
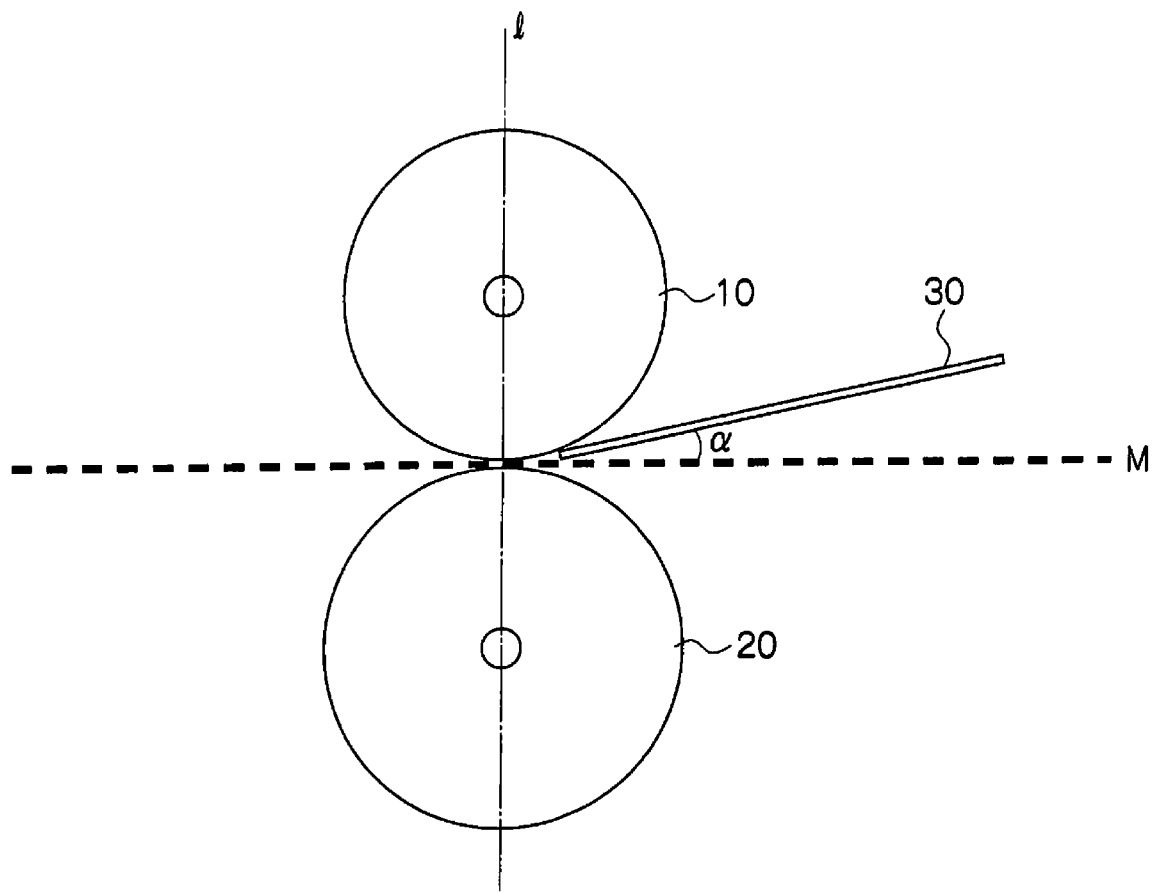
FIG. 3 is a schematic view showing a state where recording paper is entering into the transfer part.

The angle of entry α of recording paper is defined as follows. FIG. 3 schematically shows a sectional view of a state in which recording paper is entering into the transfer part, wherein character 1 designates a line connecting the central axis of a transfer roll 20 and the central axis of a supporting roll 10 (or may be an image holding member) disposed in opposition to the transfer roll 20 in the transfer part, and the angle of entry α designates an angle formed by a recording medium 30 and a surface M which is perpendicular to the line 1 at the compression part between the two rolls. In the figure, the angles upward and downward from the surface M are taken as + and −, respectively.

The intermediate transfer belt passes through the secondary transfer part, then further proceeds in the direction indicated by arrow A, and the circumference surface thereof is discharged by the discharge roll 88. Afterward, in preparation of the transfer of the next toner image, the circumference surface is cleaned by the transfer cleaner 82. The surface of the secondary transfer roll 75 is cleaned by the cleaning blade 87 which is pressed against the secondary transfer roll 75.

In the image forming apparatus of the exemplary embodiments of the invention shown in FIG. 2, the transfer roll of the invention is used as the secondary transfer roll 75. Therefore, even if recording paper conveyed to the secondary transfer part collides with the secondary transfer roll 75, the shock is absorbed by the foam-containing layer in the surface layer of the roll, and the shock will not affect the intermediate transfer belt 86. As a result, the occurrence of image defects during primary transfer is prevented with no delay in the transfer speed of the intermediate transfer belt.

As described above, in the exemplary embodiments of the invention, it is preferable to apply the transfer roll of the invention as the secondary transfer roll 75 of an image forming apparatus, but the image forming apparatus of the exemplary embodiments of the invention is not limited to that shown in FIG. 2, and may be an image forming apparatus in which the transfer roll of the invention is used as the primary transfer roll.

Further, in addition to the above-described component members, the image forming apparatus of the exemplary embodiments of the invention may comprise other component members which are commonly used in image forming apparatuses.

EXAMPLE

The invention will be further illustrated in reference to following Examples. However, the invention is not limited to the Examples. In the following illustration, all "parts" and "%" mean "parts by weight" and "% by weight", respectively, unless otherwise noted.

Example 1

(Preparation of Transfer Roll)

-Formation of Elastic Layer-

| | |
|---|---|
| Epichlorohydrin rubber (G3100, manufactured by Zeon Corporation) | 50 parts |
| NBR (DN 4050, manufactured by Zeon Corporation) | 50 parts |
| Carbon black (Special Black 4, manufactured by Degussa) | 2 parts |

-continued

| | |
|---|---|
| Foaming agent (only inner layer side): VINYFOR AC#3 (manufactured by Eiwa Chemical Ind. Co., Ltd.) | 5 parts |
| Vulcanizing agent: sulfur (200 mesh, manufactured by Tsurumi Chemical Industry Co., Ltd.) | 2 parts |
| Vulcanization accelerator: NOCCELER DM (manufactured by Ouchi Shinko Chemical Industrial Co Ltd) | 1 part |

The above-described compositions are kneaded with an open roll mill, and extruded in a cylindrical form with a simultaneous two-layer extruder on the surface of a metal shaft made of SUS 304 and having a diameter of 14 mm and a length of 370 mm, in such a manner that a layer containing the foaming agent is on the inner side and a layer containing no foaming agent is on the outer side, and a layer having a thickness of 3 mm (outside diameter; 20 mm) and a length of 323 mm is formed. The extruded product is vulcanized at 170° C. for 30 minutes to allow only the inner layer containing the foaming agent to foam. Then, stone grinding is performed with a grinding machine, and a roll having an outside diameter of 28 mm (the thickness of the elastic layer; 6 mm) composed of a foamed layer on the inside and a non-foamed layer on the outside is obtained. The resistance value of the obtained roll is $10^{7.0}\Omega$ at 22° C. and 55% RH, and the Ascar C hardness of the roll is 30°.

-Formation of Surface Layer-

As the coating device, besides a spray coating device, 50 ink jet nozzles having a discharge port diameter of 50 μm are placed in line, and as an ink tank connected to them, an ink jet coating device provided with tanks necessary for the relevant coating agent is prepared. As the coating solution, a fluorocarbon resin-based paint (JLY-601E, manufactured by Acheson (Japan) Ltd.) is used. Using one tank, the coating solution is applied onto the surface of the above-described roll having an elastic layer from end to end by spray coating (coating pressure: 2 Pa·s) and ink jet coating (coating pressure: 5 MPa·s) while the roll is rotated at 5 to 60 rpm. No preheating is performed before coating.

In the first place, a solid layer having a thickness of 8.5 μm is formed on the surface of the elastic layer by spray coating, thereafter a foam-containing coat layer is formed in three layers (coating process is repeated three times) on the surface of the solid layer using the above-described ink jet coating device. Thus a transfer roll 1 on which a surface layer having a thickness of 10 μm is formed is obtained after drying. The thickness of the surface layer and the foam-containing layer is determined by cutting the obtained transfer roll from the outside to the core bar with a sharp knife or the like, and observing the section under an optical microscope.

The observation of the section of the surface layer under a scanning electron microscope indicates the presence of a foam-containing layer in which independent bubbles having a maximum diameter of 0.5 μm accounts for 80% in terms of an area ratio, in the region of 1.5 μm from the surface. The variation of the maximum diameter of bubbles is 0.8%.

The transfer roll prepared as described above has an Ascar C hardness of 31°, and a resistance value of $1\times10^{7.1}\Omega$. No bubbles are exposed at the surface of the transfer roll. The surface of the roll has a ten point average roughness Rz of 7 μm, and a microhardness of 0.18°.

(Evaluation of Transfer Roll)

As the evaluation apparatus, a modified version of DocuColor 5065P (manufactured by Fuji Xerox Co., Ltd.) as shown in FIG. 2, in which the secondary transfer roll is substituted with the transfer roll prepared as described above, and the angle of paper entry into the secondary transfer part is made variable. Image formation is performed on A4 sheets (basis weight: 200 g/m²) in the longitudinal delivery direction (delivered in the direction along the longer side of the sheet) at a process speed of 260 mm/sec in an environment of 20° C. and 10% RH, and evaluations are performed as follows.

-Angle of Paper Entry into Secondary Transfer Part-

The angle of entry (α) of recording paper into the secondary transfer part is gradually varied from 0° to investigate the angle at which an image defect (banding) occurs at the primary transfer part. As a result, it is found that no image defect occurs when the value of α is within the range up to ±15.

-Cleaning Stability of Transfer Roll-

In the next place, image formation is continuously performed on 1,000 sheets in the above-described environment with the angle of entry of recording paper into the secondary transfer part is fixed at 15°, and the weight of transferred toner is fixed at 1 g. The degree of contamination of the secondary transfer roll is examined by the weight of the residual toner, and rated according to the following evaluation criteria.

G1: Less than 0.01 g
G2: 0.01 g or more and less than 0.02 g
G3: 0.02 g or more

-Comprehensive Evaluation-

In consideration of the above-described evaluation items and manufacturability of the transfer roll, comprehensive evaluation is rated by the following criteria.

G1: No problem in all items
G2: Minor problem but tolerable in terms of quality
G3: Minor problem and unacceptable in terms of quality
G4: Defective in all items Example 2

The transfer roll 2 is obtained in the same manner as the preparation of the transfer roll in Example 1, except that the surface layer is formed by forming a layer containing 77% (in area ratio) of independent bubbles having a maximum diameter of 10 μm to a thickness of 10 μm on the surface of the above-described solid layer; then forming a layer containing 79% (in area ratio) of independent bubbles having a maximum diameter of 5 μm to a thickness of 10 μm; and further forming a layer containing 80% (in area ratio) of independent bubbles having a maximum diameter of 0.5 μm to a thickness of 5 μm, using an ink jet coating device.

The properties of the transfer roll 2 are examined in the same manner as the measurements in Example 1. Further, the transfer roll 2 is evaluated as a transfer roll in the same manner as in Example 1. The results are summarized in Table 1.

Example 3

The transfer roll 3 is obtained in the same manner as the transfer roll as prepared in Example 1, except that the surface layer is formed by forming a layer containing 87% (in area ratio) of independent bubbles having a maximum diameter of 0.05 μm to a thickness of 0.05 μm (single layer structure) on the surface of the above-described solid layer, using an ink jet coating device.

The properties of the transfer roll 3 are examined in the same manner as the measurements in Example 1. Further, the transfer roll 3 is evaluated as a transfer roll in the same manner as in Example 1. The results are summarized in Table 1.

Example 4

The transfer roll 4 is obtained in the same manner as the transfer roll as prepared in Example 1, except that the surface layer is formed by forming a layer containing 80% (in area ratio) of independent bubbles having a maximum diameter of 40 μm to a thickness of 40 μm (single layer structure) on the surface of the above-described solid layer, using an ink jet coating device.

The properties of the transfer roll 4 are examined in the same manner as the measurements in Example 1. Further, the transfer roll 4 is evaluated as a transfer roll in the same manner as Example 1. The results are summarized in Table 1.

Example 5

The transfer roll 5 is obtained in the same manner as the transfer roll as prepared in Example 1, except that the surface layer is formed by forming a layer containing bubbles having a maximum diameter of 0.5 μm is formed on the surface of the above-described solid layer using an ink jet coating device, so that the variation in the maximum diameter of the bubbles is 2.0%.

The properties of the transfer roll 5 are examined in the same manner as the measurements in Example 1. Further, the transfer roll 5 is evaluated as a transfer roll in the same manner as in Example 1. The results are summarized in Table 1.

Example 6

The transfer roll 6 is obtained in the same manner as the transfer roll as prepared in Example 1, except that the surface layer is formed by forming a layer containing 76% (in area ratio) of bubbles having a maximum diameter of 1.5 μm to a thickness of 30 μm (double layer structure) on the surface of the above-described solid layer, using an ink jet coating device.

The properties of the transfer roll 6 are examined in the same manner as the measurements in Example 1. Further, the transfer roll 6 is evaluated as a transfer roll in the same manner as in Example 1. The results are summarized in Table 1.

Example 7

The transfer roll 7 is obtained in the same manner as the transfer roll as prepared in Example 1, except that no solid layer is formed and the surface layer is formed by forming a layer containing 80% (in area ratio) of bubbles having a maximum diameter of 0.5 μm to a thickness of 1.5 μm (triple layer structure) on the surface of the elastic layer using an ink jet coating device.

The properties of the transfer roll 7 are examined according to the measurements in Example 1. Further, the transfer roll 7 is evaluated as a transfer roll in the same manner as in Example 1. The results are summarized in Table 1.

Example 8

The transfer roll 8 is obtained in the same manner as the transfer roll as prepared in Example 1, except that the surface layer is formed by forming a layer containing 80% (in area ratio) of bubbles having a maximum diameter of 0.5 μm to a thickness of 1.5 μm (triple layer structure) on the surface of the elastic layer using an ink jet coating device, and thereafter forming a solid layer having a thickness of 8.5 μm by spray coating.

The properties of the transfer roll 8 are examined as according to the measurements in Example 1. Further, the transfer roll 8 is evaluated as a transfer roll in the same manner as Example 1. The results are summarized in Table 1.

Example 9

The transfer roll 9 is obtained in the same manner as the transfer roll as prepared in Example 1, except that the surface layer is formed by forming a layer containing independent bubbles having a maximum diameter of 1 μm to a thickness of 2 μm (triple layer structure) on the surface of the solid layer using an ink jet coating device, in the region between points 30 mm from either side of the center of the transfer roll in an axial direction; and thereafter forming a layer containing independent bubbles having a maximum diameter of 30 μm to a thickness of 50 μm (double layer structure), in the regions between the ends of the transfer roll and points 30 mm from the respective ends of the transfer roll toward the center thereof in the axial direction.

The properties of the transfer roll 9 are examined as according to the measurements in Example 1. Further, the transfer roll 9 is evaluated as a transfer roll in the same manner as in Example 1. The results are summarized in Table 2.

Further, using the transfer roll 9, a running test (continuous image formation) is performed and evaluated in accordance with the criteria used in Example 1. As a result, riding up of the cleaning blade of the transfer roll does not occur, whereas a trend is observed that paper releasability is slightly impaired, at the point of the 400,000th image formation. The term "slightly impaired" here indicates the situation where paper clogging occurs 1 to 5 times during the running of 100,000 sheets.

Example 10

The transfer roll 10 is obtained in the same manner as the transfer roll as prepared in Example 1, except that the surface layer is formed by forming a layer containing independent bubbles having a maximum diameter of 4 μm to a thickness of 10 μm (triple layer-structure) on the surface of the solid layer using an ink jet coating device, in the region between points 30 mm from either side of the center of the transfer roll in an axial direction; and thereafter forming a layer containing independent bubbles having a maximum diameter of 15 μm to a thickness of 20 μm (double layer structure), in the regions between the ends of the transfer roll and points 30 mm from the respective ends of the transfer roll in the axial direction.

The properties of the transfer roll 10 are examined as according to the measurements in Example 1. Further, transfer roll 10 is evaluated as a transfer roll in the same manner as in Example 1. The results are summarized in Table 2.

Further, using the transfer roll 10, a running test (continuous image formation) is performed and evaluated in accordance with the criteria used in Example 1. As a result, paper releasability is not impaired, and riding up of the cleaning blade of the transfer roll does not occur, at the point of the 400,000th image formation.

Example 11

The transfer roll 11 is obtained in the same manner as the transfer roll as prepared in Example 1, except that the surface layer is formed by forming a solid layer having a thickness of 15 μm by spray coating, in the region between points 30 mm from either side of the center of the transfer roll in an axial direction, and a solid layer having a thickness of 20 μm in the regions between the ends of the transfer roll and points 30 mm from the respective ends of the transfer roll toward the center thereof in the axial direction by 30 mm; and thereafter forming a layer containing independent bubbles having a maximum diameter of 2.5 μm and having a thickness of 5 μm (double layer structure) by an ink jet coating device. As a result, the film thickness of the surface layer is 20 μm at the central part and 25 μm at the end parts of the transfer roll, wherein the difference between the outside diameters at the central part and at the end parts is 10 μm, and wherein the left-right difference across the center of the outside diameter is 10 μm or less at any position.

The properties of the transfer roll 11 are examined as according to the measurements in Example 1. Further, the transfer roll 11 is evaluated as a transfer roll 11 in the same manner as in Example 1. The results are summarized in Table 2.

Further, a running test with A3 sheets is conducted and evaluations of generation of paper crease, defects in longitudinal magnification and defects in color registration are made on the transfer roll 11. In the running test, the transfer roll 11 is used instead of the secondary transfer roll in the Docu-Color-II C4300, manufactured by Fuji Xerox Co., Ltd. having the structure as shown in FIG. 1, and the test is conducted in an environment of 28° C. and 85% RH. As a result, no defect in longitudinal magnification or color registration is generated and paper crease can be prevented.

Example 12

The transfer roll 12 is obtained in the same manner as the transfer roll as prepared in Example 11, except that the surface layer only consists of a foam-containing layer, without providing a solid layer, and has the thickness equivalent of that in Example 11, wherein the difference between the outside diameters at the central part and at the end parts is 10 μm.

The properties of the transfer roll 12 are examined as according to the measurements in Example 1. Further, the transfer roll 12 is evaluated as a transfer roll in the same manner as in Example 1. The results are summarized in Table 2.

Further, the evaluation was conducted on the transfer roll 12, in accordance with that in Example 11. As a result, paper crease can be prevented, whereas longitudinal magnification and color registration are slightly impaired. The term "slightly impaired" here indicates the situation where no generation of the defects is observed by the naked eye, whereas defects in longitudinal magnification and color registration are observed under a microscope with a magnifying power of ten times.

Comparative Example 1

The transfer roll 13 is obtained in the same manner as the transfer roll as prepared in Example 1, except that the surface layer is formed only from a solid layer having a thickness of 20 μm, by spray coating.

The properties of the transfer roll 13 are examined in the same manner as the measurements in Example 1. Further, the transfer roll 13 is evaluated as a transfer roll in the same manner as in Example 1. The results are summarized in Table 1.

When a running test is conducted on the transfer roll 13 in accordance with the evaluation in Example 9, riding up of the cleaning blade of the transfer roll 13 is generated at the point of about 200,000 sheets.

Comparative Example 2

The transfer roll 14 is obtained in the same manner as the transfer roll as prepared in Example 1, except that the coating solution is changed to a fluorocarbon resin paint (EMURALON 312, manufactured by Acheson (Japan) Ltd.), and the surface layer is formed only from a solid layer having a thickness of 20 μm, by spray coating.

The properties of the transfer roll 14 are examined in the same manner as the measurements in Example 1. Further, the transfer roll 14 is evaluated as a transfer roll in the same manner as in Example 1. The results are summarized in Table 1.

TABLE 1

| | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Elastic layer | Ascar C hardness (°) | 30 | 30 | 30 | 30 | 30 | 30 | 30 | 30 | 30 | 30 |
| | Resistance value (logΩ) | 7.0 | 7.0 | 7.0 | 7.0 | 7.0 | 7.0 | 7.0 | 7.0 | 7.0 | 7.0 |
| Surface layer | Bubble diameter (μm) | 0.5 | 10/5/0.5 | 0.05 | 40 | 0.5 | 0.15 | 0.5 | 0.5 | — | — |
| | Variation (%) | 0.8 | 0.4/0.6/0.8 | 0.9 | 0.3 | 2.0 | 0.4 | 0.8 | 0.8 | — | — |
| | Bubbles area ratio (%) | 80 | 77/79/80 | 87 | 70 | 80 | 76 | 80 | 80 | — | — |
| | Foam-containing layer thickness (μm) | 1.5 | 15.5 | 0.05 | 40 | 1.5 | 30 | 1.5 | 1.5 | — | — |
| Surface microhardness (°) | | 0.18 | 0.12 | 0.20 | 0.11 | 0.18 | 0.15 | 0.18 | 0.25 | 0.36 | 0.27 |
| Surface roughness Rz (μm) | | 7.0 | 7.0 | 2.5 | 25 | 7.0 | 7.0 | 7.0 | 5.0 | 5.0 | 5.0 |
| Roll resistance value (Ω) | | $1 \times 10^{7.1}$ | $1 \times 10^{7.1}$ | $1 \times 10^{7.1}$ | $1 \times 10^{7.2}$ | $1 \times 10^{7.0}$ | $1 \times 10^{7.1}$ | $1 \times 10^{7.0}$ | $1 \times 10^{7.1}$ | $1 \times 10^{7.0}$ | $1 \times 10^{7.0}$ |
| Ascar C hardness of roll (°) | | 31 | 32 | 31 | 33 | 31 | 32 | 31 | 31 | 31 | 31 |
| Possible angle of entry of paper (°) | | ±15 | ±30 | ±10 | ±35 | ±20 | ±20 | ±15 | ±10 | ±1 | ±5 |

TABLE 1-continued

|  | Example 1 | Example 2 | Example 3 | Example 4 | Example 5 | Example 6 | Example 7 | Example 8 | Comparative Example 1 | Comparative Example 2 |
| --- | --- | --- | --- | --- | --- | --- | --- | --- | --- | --- |
| Transfer roll cleanability | G1 | G1 | G1 | G2 | G2 | G2 | G1 | G1 | G3 | G2 |
| Comprehensive evaluation | G1 | G1 | G2 | G2 | G2 | G2 | G1 | G2 | G4 | G3 |

TABLE 2

|  | Example 9 | Example 10 | Example 11 | Example 12 |
| --- | --- | --- | --- | --- |
| Surface microhardness (°) | 0.18 | 0.18 | 0.18 | 0.18 |
| Surface roughness Rz (μm) | 7.0 | 7.0 | 7.0 | 7.0 |
| Roll resistance value (Ω) | $1 \times 10^{7.1}$ | $1 \times 10^{7.1}$ | $1 \times 10^{7.1}$ | $1 \times 10^{7.1}$ |
| Ascar C hardness of roll (°) | 31 | 31 | 31 | 31 |
| Possible angle of entry of paper (°) | ±15 | ±15 | ±15 | ±15 |
| Transfer roll cleanability | G1 | G1 | G1 | G1 |
| Paper releasability | G2 | G1 | G1 | G1 |
| Riding up of cleaning blade | G1 | G1 | G1 | G1 |
| Paper crease | G2 | G2 | G1 | G1 |
| Londitudinal magnification and Color registration | G2 | G2 | G1 | G2 |
| Comprehensive evaluation | G2 | G2 | G1 | G2 |

As shown in Tables 1 and 2, when a transfer roll of Examples including a foam-containing layer in the surface layer is used, occurrence of image defects at the primary transfer part can be prevented even when the angle of entry of the recording paper into the transfer part is increased, and stable transferring properties, including cleanability of the surface of the transfer roll and avoidance of riding up of a cleaning blade, can be maintained.

All publications, patent applications, and technical standards mentioned in this specification are herein incorporated by reference to the same extent as if each individual publication, patent application, or technical standard was specifically and individually indicated to be incorporated by reference.

What is claimed is:

1. A transfer roll comprising a metal shaft, one or more elastic layers provided around the periphery of the metal shaft, and a surface layer comprising a foam-containing layer provided around the periphery of the one or more elastic layers,
wherein the maximum diameter of bubbles at the end parts of the transfer roll in the axial direction is greater than the maximum diameter of bubbles at the central part of the transfer roll in the axial direction.

2. The transfer roll of claim 1, wherein the foam in the foam-containing layer comprises bubbles and the maximum diameter of the bubbles is in a range of 0.1 to 30 μm.

3. The transfer roll of claim 2, wherein the variation in the maximum diameter of bubbles is in a range of 0 to 1%.

4. The transfer roll of claim 1, wherein the thickness of the foam-containing layer is in a range of 0.1 to 30 μm.

5. The transfer roll of claim 1, wherein the thickness of the surface layer at the end parts of the transfer roll in the axial direction is greater than the thickness of the surface layer at the central part of the transfer roll in the axial direction.

6. The transfer roll of claim 1, wherein the outside diameter of the transfer roll at the end parts of the transfer roll in the axial direction is greater than the outside diameter of the transfer roll at the central part of the transfer roll in the axial direction, by 1 to 500 μm.

7. The transfer roll of claim 1, wherein the one or more elastic layers comprise a nonfoamed layer and a foamed layer.

8. The transfer roll of claim 1, wherein the amount of bubbles in the foam-containing layer is in a range of 30 to 90% in area ratio.

9. The transfer roll of claim 1, wherein the foam-containing layer comprises a plurality of layers.

10. The transfer roll of claim 9, wherein the maximum diameters of bubbles differ according to the respective layers.

11. The transfer roll of claim 1, wherein the surface layer comprises the foam-containing layer and a solid coat layer containing no bubbles.

12. The transfer roll of claim 11, wherein a thickness of the solid coat layer is in a range of 0.1 to 10 μm.

13. The transfer roll of claim 11, wherein a thickness of the solid coat layer is in a range of 20 to 50% of the total thickness of the surface layer.

14. The transfer roll of claim 1, wherein a surface microhardness of the surface layer is 0.2 or less.

15. The transfer roll of claim 1, wherein a surface roughness of the surface layer is in a range of 5 to 15 μm in ten point average roughness Rz.

16. The transfer roll of claim 1, wherein a hardness of the transfer roll is in a range of 15° to 90° in Ascar C hardness.

17. The transfer roll of claim 1, wherein a resistance value of the transfer roll is in a range of $1 \times 10^5$ to $1 \times 10^{11} \Omega$.

18. An image forming apparatus comprising at least an image holding member, a charging unit for charging a surface of the image holding member, a latent image forming unit for forming a latent image on the surface of the image holding member, a developing unit for developing the latent image formed on the surface of the image holding member into a toner image, and a transfer unit for transferring the toner image onto a recording medium, the transfer unit composing the transfer roll that is the transfer roll of claim 1.

19. The image forming apparatus of claim 18, further comprising an intermediate transfer member, wherein the transfer unit is a secondary transfer unit for transferring the toner image, which has been primarily transferred from the surface of the image holding member onto a surface of the intermediate transfer member, onto the recording medium, and the transfer roll is a secondary transfer roll that is a component of the secondary transfer unit.

20. The image forming apparatus of claim 19, wherein the angle of entry of the recording medium into the secondary transfer unit is in a range of −40° to −10° or 10° to 40°.

21. The image forming apparatus of claim 18, wherein a cleaning blade is disposed in contact with the surface of the transfer roll.

* * * * *